D. SALGET.
RAKE ATTACHMENT.
APPLICATION FILED JULY 13, 1912.
1,058,470.
Patented Apr. 8, 1913.
2 SHEETS—SHEET 2.
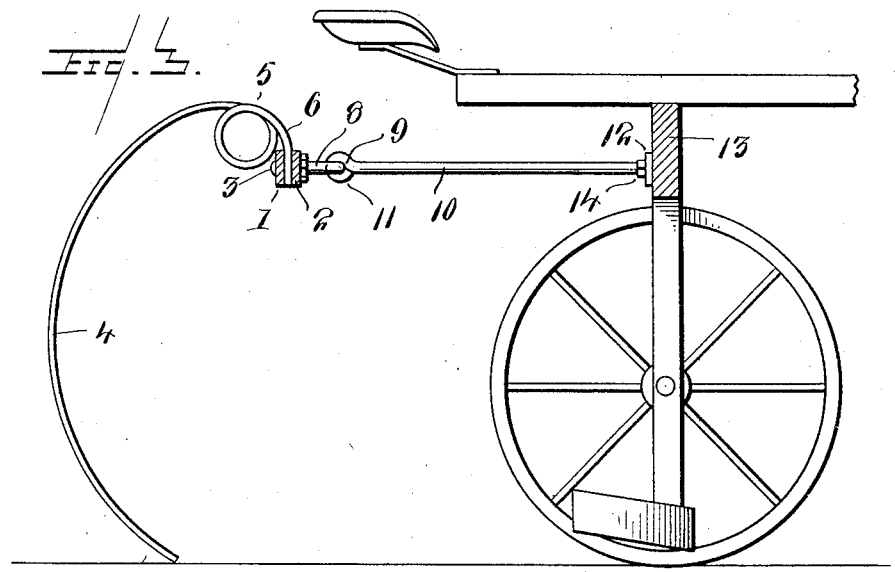
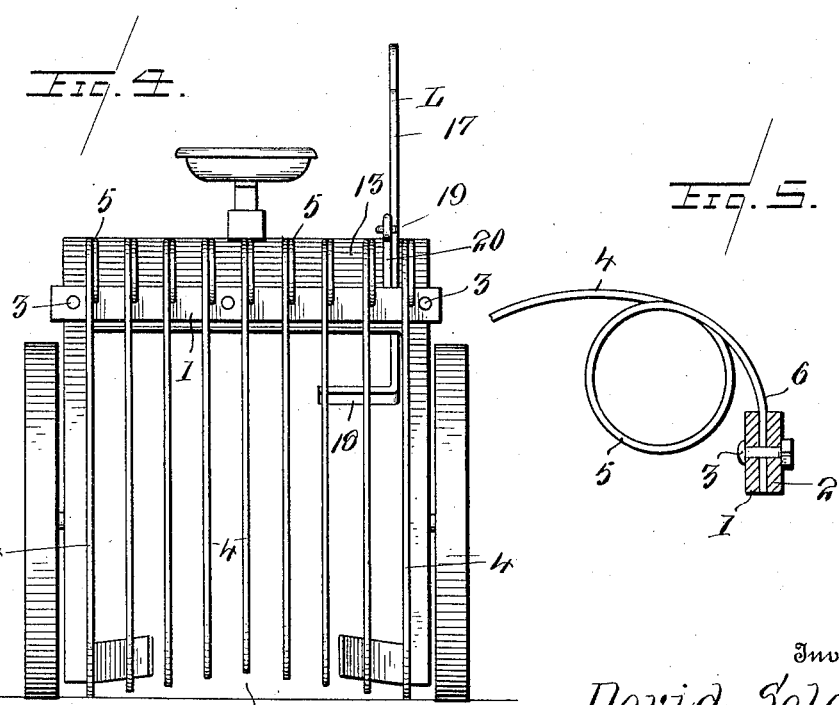
Inventor
David Salget
By Victor J. Evans
Attorney

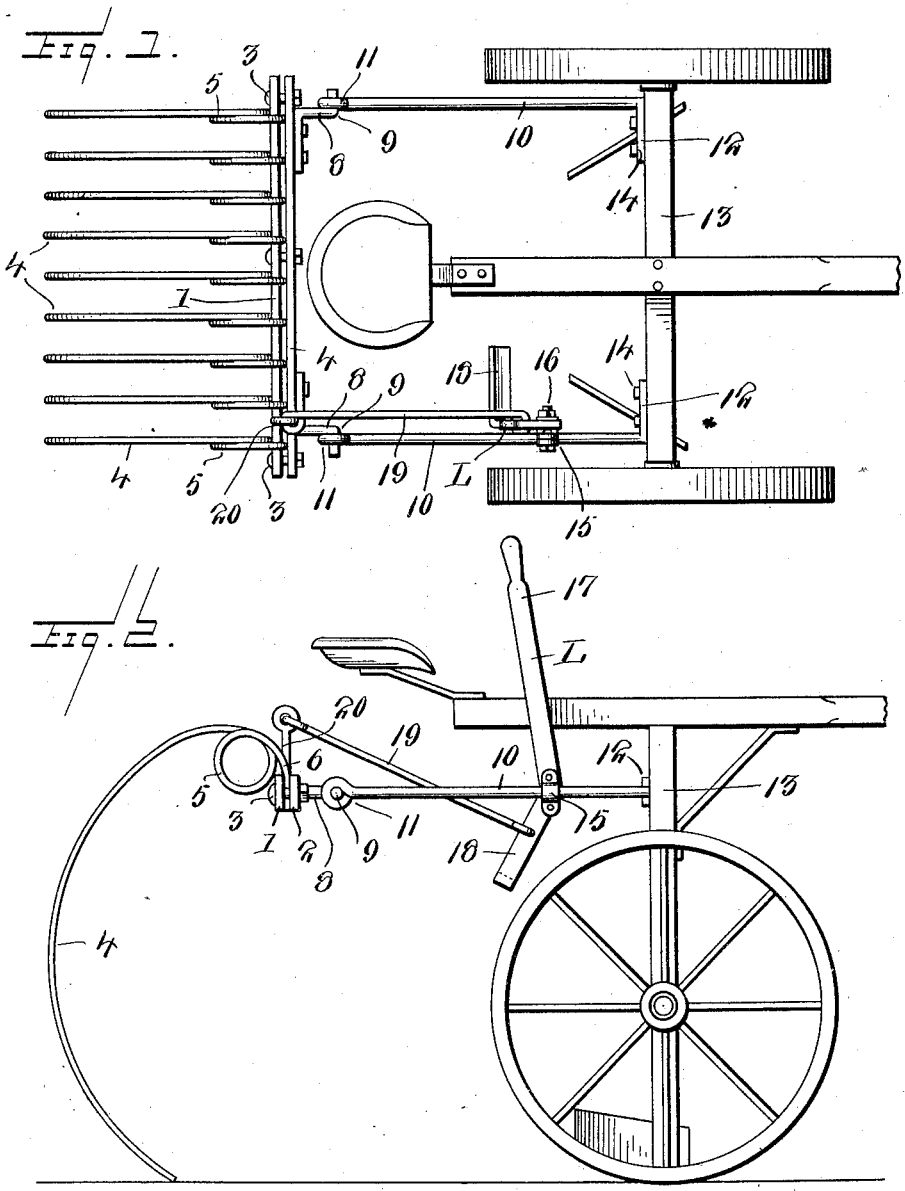

UNITED STATES PATENT OFFICE.

DAVID SALGET, OF SAGINAW, MICHIGAN, ASSIGNOR OF ONE-THIRD TO ADOLPH J. KOENIG AND ONE-THIRD TO JERRY SALGET, BOTH OF SAGINAW, MICHIGAN.

RAKE ATTACHMENT.

1,058,470.      Specification of Letters Patent.      Patented Apr. 8, 1913.

Application filed July 13, 1912. Serial No. 709,156.

*To all whom it may concern:*

Be it known that I, DAVID SALGET, a citizen of the United States, residing at Saginaw, in the county of Saginaw and State of Michigan, have invented new and useful Improvements in Rake Attachments, of which the following is a specification.

This invention relates to rakes, and it has particular reference to a rake attachment adapted to be used in connection with vine pulling machines for the purpose of raking bean or pea vines and pulled by such machines into suitable piles.

The principal object of the invention is to produce a device of extremely simple and inexpensive construction which may be readily applied to and used in connection with any ordinary type of vine pulling machine.

A further object of the invention is to provide simple and efficient operating means whereby the vines gathered by the rake may be dumped into suitable piles.

A further object of the invention is to so construct the rake attachment that it will be adapted to the contour of the ground, including the peculiar ridge which is formed when a vine puller of ordinary construction is used.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a top plan view of a device constructed in accordance with the invention, showing also a portion of the frame of a vine puller with which it is connected. Fig. 2 is a side elevation. Fig. 3 is a side elevation as seen from the opposite side. Fig. 4 is a rear elevation. Fig. 5 is a sectional detail view taken through the rake head.

Corresponding parts in the several figures are denoted by like characters of reference.

The head of the improved rake attachment is formed of two metallic straps or bars 1 and 2 which are connected together at intervals by clamp bolts 3. The rake teeth 4 are each constructed with an eye or spring coil 5 and with a shank 6, the latter being inserted between the bars 1 and 2 where it will be held securely by tightening or clamp bolts. Any desired number of teeth may be employed, and it will be particularly observed by reference to Fig. 4 of the drawings that the said teeth are supported at various elevations, the center tooth terminating at the apex, and the remaining teeth along the sides of a recess 7 of isosceles triangular shape, the base of which may be regarded as formed by the surface of the ground. The teeth are arranged in this particular manner because vine pullers in passing over the ground in the act of pulling the vines will form a shallow triangular ridge on which the vines are deposited. If the teeth of the rake attachment were made to terminate all at the same level, as is the case with an ordinary hay rake, the said teeth or the majority of them would be compelled to dig into the ground to some extent in order to operate successfully. Being adapted to the contour of the ground in the manner shown, the rake attachment will operate efficiently at all times and without necessity for any of the teeth digging into the ground. It will also be seen that the precise adjustment of the teeth may be readily varied to enable the device to be used in connection with different makes of vine pullers which will sometimes form the ground into ridges of different contours while in operation.

The front bar 2 of the rake head is provided near the ends thereof with brackets 8 having forwardly extending L-shaped lugs 9. Connecting arms 10 are provided at their rear ends with eyes 11 pivotally engaging the L-shaped lugs 9, and said arms are provided at their front ends with lateral extensions 12 whereby they are connected with the frame 13 of the vine puller, any suitable connecting means, such as bolts or clamps 14 being employed.

Adjustably mounted on one of the arms 10 is a clip member 15 having a laterally extending pin 16 on which is fulcrumed a lever L having an upwardly extending arm 17 whereby it may be manipulated and a downwardly extending pedal 18 enabling it to be operated by the foot of the operator. The lever L is connected by a link 19 with an arm or bracket 20 that extends upwardly from the rake head where said arm or bracket is adjustably clamped between the front and rear bars 1 and 2. The operation and advantages of this invention will be readily understood from the foregoing description taken in connection with the drawings hereto annexed by those skilled in the art to which it appertains.

It is evident that the improved rake attachment may be manufactured and marketed at a moderate expense and also that it may be conveniently attached to any vine pulling machine of ordinary construction without the use of skilled labor. The operator who is positioned on the seat with which the vine pulling machine is usually provided is in convenient proximity to the lever L, and by placing one foot on the pedal 18 and grasping the handle 17 with one hand he is enabled to operate the lever very easily at any desired intervals to tilt the rake head so as to discharge the vines gathered thereby in piles, thus performing labor, the performance of which has heretofore required two or three workmen, simultaneously with the pulling of the vines and at no additional expense.

Having thus described the invention, what is claimed as new, is:—

In a rake attachment for vine pulling machines, a rake head comprising front and rear bars, clamp bolts connecting said bars, and a plurality of teeth each having a spring coil and a shank, said shanks being clamped for vertical adjustment between the front and rear bars of the rake head, and said rake teeth terminating along the sides of an isosceles triangle, the base of which is formed by the surface of the ground.

In testimony whereof I affix my signature in presence of two witnesses.

DAVID SALGET.

Witnesses:
CHAS. SCHULTE,
CLARK RANDALL.

---

Copies of this patent may be obtained for five cents each, by addressing the "Commissioner of Patents, Washington, D. C."